United States Patent [19]
Hopp

[11] 3,815,184
[45] June 11, 1974

[54] SWIVEL HOOKS
[75] Inventor: Werner Hopp, Oberstein, Germany
[73] Assignee: Firma Gebr. Batz, Heiligenhaus, Germany
[22] Filed: Oct. 25, 1972
[21] Appl. No.: 300,712

[30] Foreign Application Priority Data
Aug. 2, 1972    Germany............................ 2237920

[52] U.S. Cl. ............................... 24/239, 24/241 SL
[51] Int. Cl............................................. A44b 13/02
[58] Field of Search ...................... 294/82 R, 83 R; 24/230.5 S, 230.5 SS, 238, 239, 241 S, 241 SL, 241 TC

[56] References Cited
UNITED STATES PATENTS
| | | | |
|---|---|---|---|
| 249,333 | 11/1881 | Gibbons................................. | 24/239 |
| 279,477 | 6/1883 | Bellairs................................. | 24/239 |
| 1,444,311 | 2/1923 | Kasch ................................. | 24/239 |
| 1,660,028 | 2/1928 | Baxter.................................. | 24/239 |
| 1,676,167 | 7/1928 | Sprain ........................... | 24/241 SL |
| 2,419,947 | 5/1947 | Foreman.............................. | 24/239 |

*Primary Examiner*—Richard E. Aegerter
*Assistant Examiner*—Johnny D. Cherry

[57] ABSTRACT

A carbine hook which comprises a hook shaft leading into a hook head, the latter including a top. A hook mouth, and a slide closing the hook mouth and guided on the hook shaft are provided. The hook mouth includes a hook end face, and the slide has an outwardly projecting operational face. A slide abutment face is disposed opposite the hook end face, and the operational face starts within the range of the slide abutment face moving toward the hook end face.

9 Claims, 4 Drawing Figures

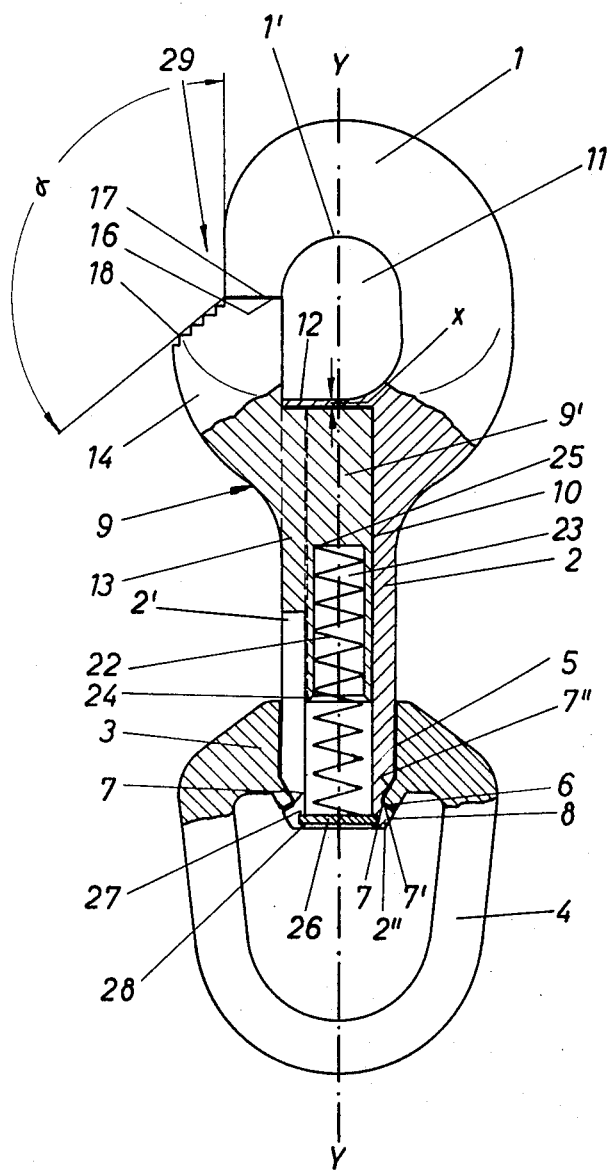

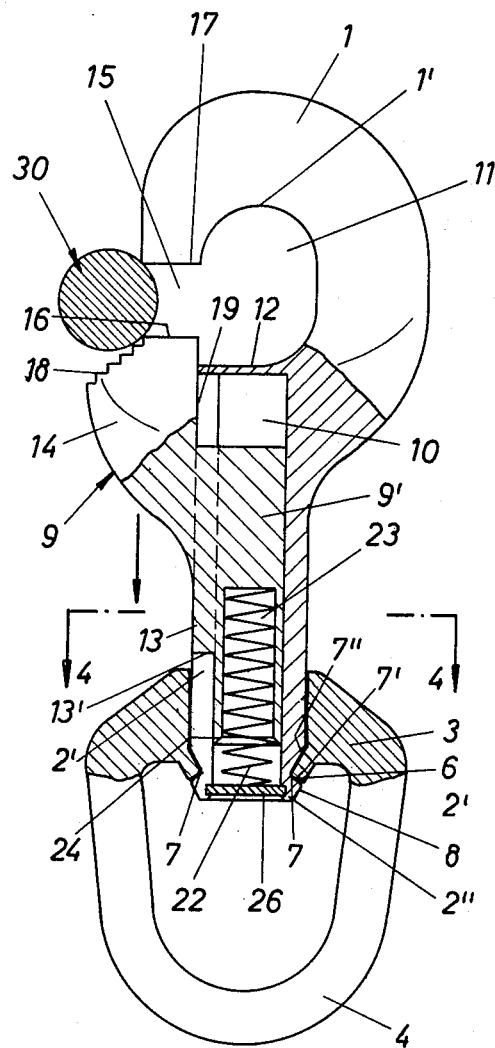
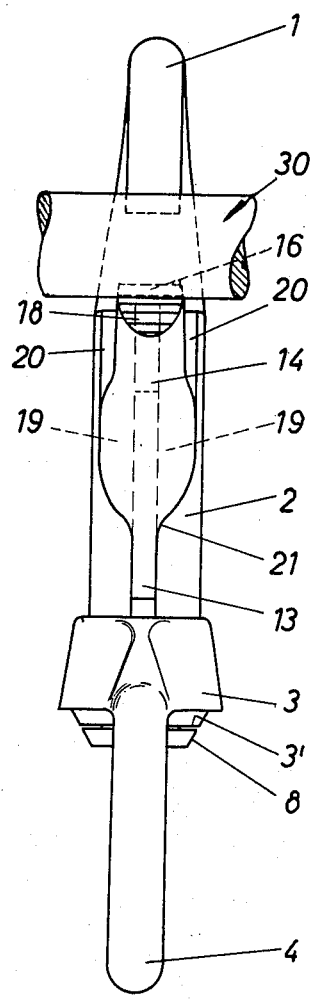
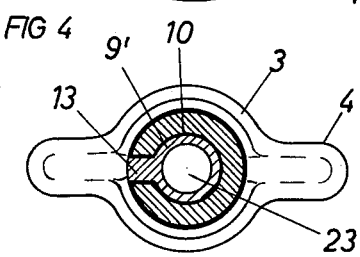

SWIVEL HOOKS

The present invention relates to a carbine swivel with a hook mouth closed by a slide guided by a hook shaft, which slide has an outwardly projecting operational face.

The known structural forms of such carbine swivels are not also loaded outside of their center, due to the fact, that the locking slide and the hook end is disposed in the hook shaft axis, rather is difficulty serviceable. First of all, however, the hook base set off from the axis line due to the construction assumes a not unessential negative influence on the strength values; where a strength of lower strength would suffice, the manufacturer is obliged, to replace material having the required characteristics by essentially more expensive material.

It is one object of the present invention to improve a carbine swivel concerning its handling, its production and its stabilization.

It is another object of the present invention, to provide a carbine swivel, wherein the operational face engages within the range of the abutment face of the slide moving toward the end face of the hook.

It is thereby favorable in accordance with the present invention, if the operating face extends obliquely falling down in relation to the displacement direction of the slide.

Furthermore it is of advantage in accordance with the present invention, that the cross-section of the slide corresponds over its total free length about with the size of the abutment face plus the operating face.

An advantageous feature of the present invention resides in the fact, that the slide has guide faces moving towards side flanks of the hook shaft.

The present invention also proposes, that the top of the hook head is disposed about in axial alignment to the hook shaft.

Due to such design, a carbine swivel of increased use value is created. It is marked by easy handling with a safe hook closure. By the displacement of the slide abutment face moving toward the hook end face jointly with the operational face disposed within the range of the slide abutment face, the free hook end can be displaced so far outwardly without loss of stability, that the top of the hook end is disposed about in axial alignment to the hook shaft. The direction of force is accordingly in the direction of the hook axis. Higher strength values can be obtained. The corresponding construction leads to a harmonic design, avoiding corners and edges, and reducing the accident or injury danger. The carbine swivel can be produced in a pressure casting process. As tests of tearing apart did show, the strength lies, in relation with comparable structures, which indicated 230 to 250 kg, in a carbine swivel produced in the pressure casting process at 400 kg, and this is in spite of the fact, that in case of malleable iron as a rule the strength against tearing apart should be higher than by more proper pressure casting. The operational face is disposed most favorably in the range of the slide abutment face. By inclination of the operational face, not only the service advantage is achieved, that the operating finger extends in a place below the operating face; rather this face can also serve as insert inclination. It is known that corresponding carbine swivels are used mostly on ship structures. In particular in case of prevailing cold and wetness, and when the operator wears gloves, the upward pressing of the slide, having a comparatively small operational face, is rendered more difficult, this first of all in case of strong corrosion, in which case the operator with the small finger face can master with difficulty the required opening forces. Thus the solution, to provide the operational face in the range of the hook end face, constitutes an essential handling simplification. It is then only necessary to put by example on a wire cable or the like the carbine swivel, strongly and nearly completely held in the hand of the operator in the required manner, so that the operational face moves toward this counter bearing. Without finger operation, the closing slide can be moved into the open position, so that the intended hook operation takes place. Also in stabilizing direction it is favorable particularly in relation to the slide, that its cross section corresponds, on its entire length, that means over its freely disposed length, about the joint value of the abutment face and the operational face. The taken structural measure, that the slide has guide faces engaging side flanks of the hook shaft, operates, also in case of larger force requirements, against a displacement of the face-like engaging parts, so that in the range of the hook opening each attacking face is avoided. By the forced coordination of the eye to the shaft, a particularly stabile structure, resisting in particular also high cross-forces is realized. Also the mounting is simplified.

With these and other objects in view, which will become apparent in the following detailed description, the present invention, which is shown by example only, will be clearly understood in connection with the accompanying drawings, in which FIG. 1 is a side elevation of the closed carbine hook;

FIG. 2 is a side elevation of the partly open carbine hook;

FIG. 3 is a front elevation thereof; and

FIG. 4 is a section along the lines IV — IV of FIG. 2.

Referring now to the drawings, a hook 1 of the carbine hook shown at an enlarged scale continues integrally into a cylindrical shaft 2. On an eye end of the latter is forcibly mounted an eye 4 equipped with a ring 3. The eye 4 is secured in axial direction, otherwise, however, freely rotatable. The ring 3 has a likewise cylindrical passage opening 5 and continues into a collar 6. The latter is retracted. It extends into a complementary annular groove 7 of the hook shaft. The V-shaped annular groove 7 has a steep flank 7' and a less steep flank 7''. The driven-in collar 6 engages with its end face 8 the steeper flank 7'.

A closing slide 9 guides itself in the hook-shaft 2. The latter has for its purpose a central, cylindrical guide recess 10, which has been considered already during the forming process. This guide recess 10 terminates at a distance X from the hook recess 11. A corresponding section 12 covering the guide recess 10 is provided. The slide 9, that means its guide section 9' having cylindrical shape extends by means of a web 13 into a projection 14. The shaft 2 has over nearly its entire length a passage slot 2'. The projection 14 engages in the closed position of the hook mouth 15 with its abutment face 16 butt joined against the hook end face 17.

The slide abutment face 16 continues into the outwardly directed, obliquely falling-off operational face 18. The latter can, as shown in FIG. 1, be serrated or corrugated in crosswise direction, which serves the increase of the grip.

The insided edges of these two faces 16 and 17, pointing to the hook recess 11, close in equal covering. The slide 9 has within the range of the projection 14 over nearly its entire length an about equally large cross-section. For the additional radial securing of the closing slide, the latter moves with side flanks 19 of the hook shaft 2 extending on both sides of the web 13 toward corresponding guide faces 20 of the hook shaft 2. The side flanks 19 reduce themselves on the side of the eye, to be transformed finally over the concave bulging 21 into the web 13.

The slide 9 guided in the hook shaft 2 is spring biased in closing direction. A pressure spring 22 is provided for this purpose. The cylindrical guide section 9' of the slide has for mounting and thereby radial support of this pressure spring 22 a central, cylindrical receiving recess 23. The latter is funnel-like widened, so that the spring windings cannot hook into each other. The hook-sided winding end is effective against the recess bottom 25, while the oppositely disposed winding end rests on a counter bearing plate 26. The latter supports itself on the shoulder 27 of a widened recess. For the bearing securing, material sections 28 of the end section 2'' are driven over the edge zone of the counter bearing plate 26.

In the basic position the abutment limit of the slide movement is given by the faces 16 and 17 which approach each other, while in opposite direction the end of the guide section 9' of the slide moves against the plate 26.

The carbine hook is substantially symmetrically designed, first of all relating to the occurring force stress. As it is apparent, the hook top 1' of the hook head 1 constituting the bearing hole for a coupling ring or the like is exactly axially aligned with the hook shaft 2, so that considering the symmetrical position of the eye 4 a load direction disposed in the carbine hook axis $y-y$ presents itself.

The reduction of the hook end face 17 to the measure of the slide abutment face 16 cooperating with the former leads to a catch trough 29 mounted in front of the mouth 15 corresponding with the obtused angle in FIG. 1. This catch trough 29 opens up an advantageous operation possibility, whereby practically the entire hook lies grip tight in the hand of the operator. The carbine hook is put closer to the object 30 to be secured, by example, a wire cable, such, that the operational face 18 moves toward this object 30. The slide 9 displaces itself against the spring effect in the sense of an enlargement or opening, respectively, of the hook mouth 15, so that the object 30 can enter into the hook recess 11, whereupon the slide 9 closes again.

In consideration of the low strength of the material, the hook has a design, which permits stresses of up to 400 kp/mm. It is designed in an advantageous manner such, that the direction of the force in case of loading is disposed in the direction of the hook axis $y-y$. The displacement of the locking point connected therewith outside the hook-eye or hook-recess brings about additionally the desired favorable operation. Furthermore, advantages concerning the mounting technique occur. The hook body does not require any more bending for the mounting of the slide. All parts can rather be galvanized prior to the mounting, so that also a corrosion protection is assured to the parts which are not accessible after the assembly. All parts are inserted and secured from the eye side.

While I have disclosed one embodiment of the present invention, it is to be understood, that this embodiment is given by example only and not in a limited sense.

I claim:
1. A carbine hook comprising
   a hook shaft integrally leading into a hook head, the latter including
   a top,
   a hook mouth,
   a slide closing said hook mouth and guided on said hook shaft,
   said hook mouth including a hook end face,
   said slide having an outwardly projecting operational face,
   a slide abutment face disposed opposite said hook end face,
   said operational face starts within the range of said slide abutment facing moving toward said hook end face,
   said hook shaft has an eye end remote from said hook head and carries thereat an eye having an opening and forcibly gripping said hook shaft about said opening,
   said shaft having a longitudinal slot extending substantially over the entire length thereof starting from said eye end,
   said slide having a web portion slidaby guided in said slot,
   said shaft having a central guide recess communicating with said longitudinal slot, and starting from said eye end,
   said slide having a central guide section integrally secured to said web and slidably disposed in said central guide recess,
   said central guide section of said slide having a central receiving recess therein, extending from a recess bottom to an open end in said central guide section,
   a cover plate disposed within said opening of said eye lying in said guide recess at said eye end closing said guide recess, and
   spring in said central receiving recess abutting said recess bottom and said plate.

2. The carbine hook, as set forth in claim 1, wherein said operational face extends obliquely falling down in the direction of displacement of said slide.

3. The carbine hook, as set forth in claim 1, wherein the cross-section of said slide corresponds over its entire outside freely disposed about with the size of said slide abutment face plus said operational face.

4. The carbine hook as set forth in claim 1, wherein said hook shaft has side flanks, and said slide has guide faces moving toward said side flanks of said hook shaft, 5. The carbine hook, as set forth in claim 1, wherein said top of said hook head is disposed in axial alignment to said hook shaft.

6. The carbine hook, as set forth in claim 1, wherein said eye forms on its connecting side a ring having a collar, and
said collar is received in a complementary annular groove formed in said eye end of said hook shaft constituting a counter bearing.

7. The hook, as set forth in claim 6, wherein
said annular groove is of V-shape having a steeply inclined flank and a less steeply inclined flank relative to a longitudinal axis of said shaft, and
said collar having an end face engaging said steeply inclined flank.

8. The hook, as set forth in claim 1, wherein said shaft forms a shoulder of a widened recess adjacent said eye end,
said cover plate is supported on said shoulder.

9. The hook, as set forth in claim 1, further comprising
material sections of said eye end of said shaft driven over said cover plate.

* * * * *

UNITED STATES PATENT OFFICE
CERTIFICATE OF CORRECTION

Patent No. 3,815,184    Dated June 11, 1974

Inventor(s) Werner Hopp

It is certified that error appears in the above-identified patent and that said Letters Patent are hereby corrected as shown below:

On the cover sheet [75] "Oberstein, Germany" should read -- Idar-Oberstein, Germany --.

Signed and sealed this 15th day of October 1974.

(SEAL)
Attest:

McCOY M. GIBSON JR.
Attesting Officer

C. MARSHALL DANN
Commissioner of Patents